Patented Jan. 14, 1947

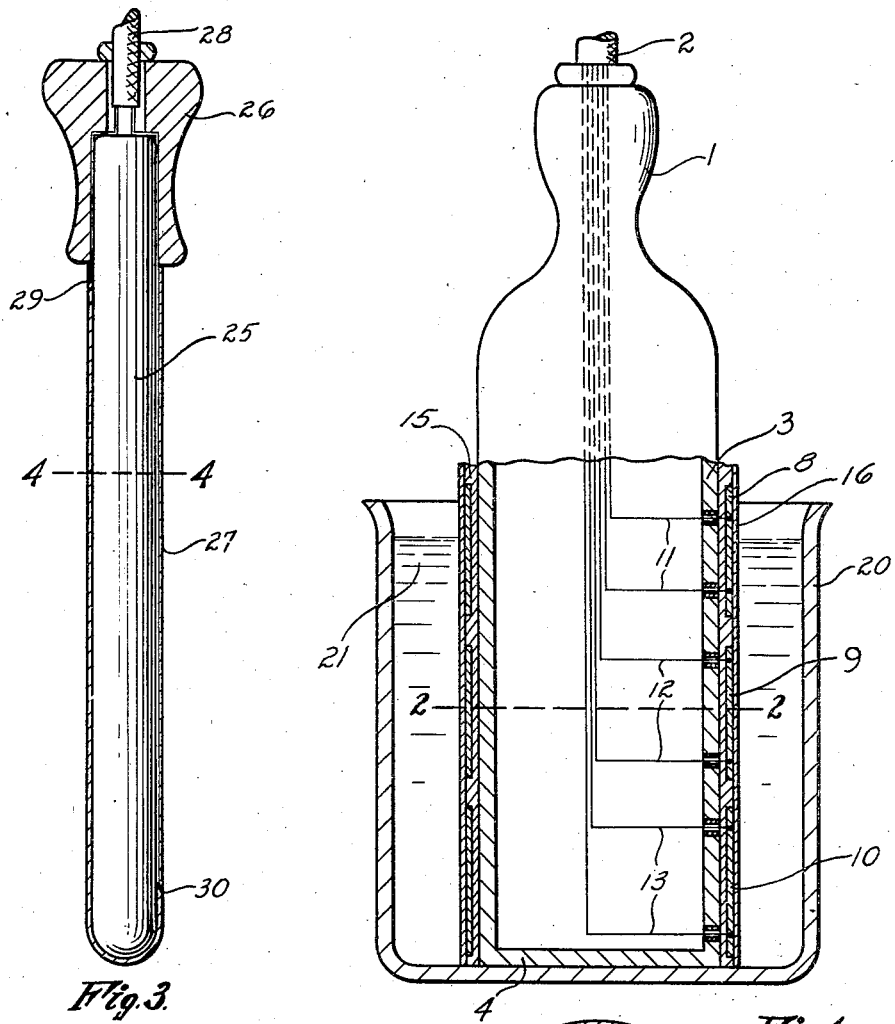

2,414,351

UNITED STATES PATENT OFFICE 2,414,351

IMMERSION HEATER

Otto E. Bender, Birmingham, Mich., assignor to B/W Controller Corporation, Birmingham, Mich., a corporation of Michigan Application December 11, 1944, Serial No. 567,624

1 Claim. (Cl. 219—41)

This invention relates to an immersion heater for liquids and it has to do particularly with an improved electrical resistance heating device adapted to heat a liquid substance.

The overall object of the invention is to provide a construction in an immersion heater which provides for increased efficiency, an increase in general utility, and provides a device easily manufactured and one that can be handled roughly and even carelessly without danger to the device itself or to the user. The utility of the device constructed in accordance with the invention is superior to previous immersion heaters particularly where it is used in the home, for example. The device can be handled and manipulated without danger by anyone in the household who need not be particularly skilled in the handling of a device of this kind. Generally speaking, the invention contemplates an immersion heater wherein the resisting element is a conductive plastic composition applied to a suitable support and this composition may be electrically insulated to protect it against contact with outside electrical conducting devices or left exposed as desired.

The accompanying drawing discloses devices made in accordance with the invention and in this drawing:

Fig. 1 is a view largely in section showing an immersion heater disposed in a vessel of liquid to be heated.

Fig. 2 is a sectional view taken substantially on line 2—2 of Fig. 1.

Fig. 3 is a sectional view showing a modified form of the invention.

Fig. 4 is a sectional view taken on line 4—4 of Fig. 3.

As illustrated in Fig. 1, the immersion heater has a suitable handle 1 and by means of a suitable electrical conductor or cable 2 the current is supplied to the heater. The body of the heater may be a metallic tube 3 having a hollow interior and the end of the body may be closed as at 4 so that liquid has no access to the interior.

As illustrated in Fig. 1, the heating elements are shown at 8, 9 and 10. Three heating elements are shown by way of example, although it is within the invention to vary the number of heating elements or use only one. The provision of different heating elements is so that the immersion heater can be used to provide different rates of heating or temperatures. Conductors 11 extend to the heating element 8, conductors 12 extend to the heating element 9, conductors 13 extend to the heating element 10. In other words, the heating element 8 is connected across the conductors 11; the heating element 9 is connected across the conductors 12; and the heating element 10 is connected across the conductors 13. In this way, one or more of the elements may be used and the elements may have different values. The several conductors all extend into the handle and suitable control means, such as one or more switches, can be employed.

The several heating elements each comprise an electrically conducting composition and may, and preferably do, completely encircle body 3. Since the body is of metal and may be an electrical conductor, the elements are insulated therefrom by a layer of insulating material 15 which lies between the body and the heating elements. In many instances, and particularly it is thought in cases where the heater is designed for home use or for use by those not particularly skilled in the handling of such a device, the heating elements are covered with a layer of insulation 16. The insulation layers 15 and 16 may be of any suitable material but preferably are of a plastic or rubber composition capable of withstanding the heat to which they are to be subjected.

The heating elements, themselves, comprise an electrical conducting composition, such as a conducting rubber composition. An example of such a composition is one having by weight, 100 parts of rubber and a substantial amount of finely divided conducting carbon black from about 50 to 80 parts. Other ingredients may be added as are considered necessary or desirable for the particular purpose including, a vulcanizing agent, a softener, a deodorant, an accelerator, and an antioxidant. The composition may be prepared by stirring the finely divided carbon black into rubber cement containing a suitable solvent. The rubber furnishes a flexible binder for the conducting carbon black. The heating elements composed of such a plastic substance may be applied to the device in any suitable thickness by molding the same thereon or by a dipping or painting or spraying process.

The flexible binder or body may be a natural rubber or an artificial or manufactured rubber, such as Buna, Thiokol or neoprene, and various resins or plastics may be used including shellac, cellulose acetate, viscose, nylon, Vinylite, casein, etc. As shown in Fig. 1, the immersion heater is disposed in a vessel 20 containing a liquid 21 to be heated.

In the modified form shown in Fig. 3, the body 25 of the immersion heater is of a non-electrical conducting substance such, for example, as glass, a suitable ceramic, or plastic, and it may be equipped with a suitable handle 26. In the form of a film or coating over the body is the plastic conducting composition 27. A suitable electrical conductor 28 has wires which may connect into the plastic substance as at 29 and 30. This form of the invention embodies a more simple construction than the form shown in Fig. 1. There is no need to insulate the heating element from the non-conducting body. The heating element 27 may be left exposed or it may be covered with an insulating covering as desired. The heating element may be left exposed particularly where the device is to be used with non-conducting vessels or beakers, or by those skilled in the handling of the device, such as laboratory technicians or the like.

In the claim appended hereto the term plastic is to cover compositions including natural or synthetic rubber and other plastic substances, such as those above named, and others. The term rubber is to include both natural and synthetic rubbers used alone or in combination with each other.

I claim:

An immersion heater adapted to heat a liquid by being immersed therein comprising, a hollow metal support, a layer of insulating material disposed about the outside of the support, a plurality of axially spaced layers of electrical conducting composition, each comprising a body of rubber-like material containing therein a sufficient quantity of carbon black to render the composition electrically conductive and resistant, said plurality of electrically conducting composition being disposed outside of the insulating material, additional insulating material disposed about and covering said layers of conducting composition, and a plurality of conductors within the hollow metal support making connection respectively with the said plurality of layers of electrically conducting material.

O. E. BENDER.